United States Patent [19]

Brenner et al.

[11] Patent Number: 4,967,353
[45] Date of Patent: Oct. 30, 1990

[54] SYSTEM FOR PERIODICALLY REALLOCATING PAGE FRAMES IN MEMORY BASED UPON NON-USAGE WITHIN A TIME PERIOD OR AFTER BEING ALLOCATED

[75] Inventors: Larry B. Brenner, Stone Ridge; Paul W. VanLeer, Highland, both of N.Y.

[73] Assignee: International Business Machines Corporation, Armonk, N.Y.

[21] Appl. No.: 390,474

[22] Filed: Aug. 3, 1989

Related U.S. Application Data

[63] Continuation of Ser. No. 19,916, Feb. 25, 1987, abandoned.

[51] Int. Cl.⁵ .......................................... G06F 12/06
[52] U.S. Cl. .................................. 364/200; 364/246; 364/246.12; 364/246.3; 364/262
[58] Field of Search ... 364/200 MS File, 900 MS File, 364/300

[56] References Cited

U.S. PATENT DOCUMENTS

| | | | |
|---|---|---|---|
| 3,964,028 | 6/1976 | Belady et al. | 364/200 |
| 4,035,778 | 7/1977 | Ghanem | 364/200 |
| 4,349,875 | 9/1982 | Tada | 364/200 |
| 4,394,732 | 7/1983 | Swenson | 364/200 |
| 4,422,145 | 12/1983 | Secco et al. | 364/200 |
| 4,437,155 | 3/1984 | Sawyer et al. | 364/200 |
| 4,499,539 | 2/1985 | Vosacek | 364/200 |
| 4,603,380 | 7/1986 | Easton et al. | 364/200 |
| 4,603,382 | 7/1986 | Cole et al. | 364/200 |
| 4,660,130 | 4/1987 | Bartley et al. | 364/200 |
| 4,680,703 | 7/1987 | Kriz | 364/200 |
| 4,703,422 | 10/1987 | Kinoshita et al. | 364/200 |
| 4,775,932 | 10/1988 | Oxley et al. | 364/200 |

OTHER PUBLICATIONS

IBM Virtual Machine/System Product High Performance Option, System Programmer's Guide, Release 4.2, pp. 22-32.

*Primary Examiner*—Thomas C. Lee
*Attorney, Agent, or Firm*—Mark S. Walker

[57] ABSTRACT

A method for memory management and block paging in a control program that controls the execution of tasks on behalf of a plurality of system computing entities, which selects, transfers blocks of data, such as pages, between storage and memory to maintain in memory only those blocks of data necessary for current system processing requirements. Pages in memory are first identified as not referenced within a preceding time period, for example, since the last examination by a core table scan mechanism, on a system wide basis. Pages so identified are then grouped into blocks of pages used by a computing entity and then transferred to storage for later retrieval as a set when any one of the pages in the set is required by the system. Pages not referenced while resident are made available for paging to memory individually. Block paging achieves a significant reduction in the system overhead associated with memory management, as compared with prior art paging mechanisms. Demand driven systemwide or global least recently used memory management achieves more efficient memory utilization.

12 Claims, 3 Drawing Sheets

SYSTEM FOR PERIODICALLY REALLOCATING PAGE FRAMES IN MEMORY BASED UPON NON-USAGE WITHIN A TIME PERIOD OR AFTER BEING ALLOCATED

This is a continuation of application Ser. No. 07/019,916, filed Feb. 25, 1987, now abandoned.

BACKGROUND OF THE INVENTION

1. Field of the Invention

The present invention relates to computer control programs, and more particularly relates to that feature of such control programs that controls the transfer of pages of data between storage and memory for the purpose of memory management.

2. Background Art

Memory management is a necessary function in large mainframe control programs, particularly those in which multiple computing entities with multiple tasks may be created and run simultaneously. The real memory of even a large mainframe computer system may be insufficient to service every task running in the system at a particular time. Accordingly, control programs for such mainframes employ an expedient known as "paging".

Control programs implementing manage real memory in units of fixed size, called pages, typically 4 kilobytes. Real memory is divided into real page frames each able to hold one page of data. The programs and data associated with the tasks being executed are organized into pages. Pages associated with a task can be assigned to a real page frame and thus be available for use by the task, or they can be "paged out" to a paging device or a direct access storage device (DASD). The pages from all active computing entities and tasks compete for available page frames. Only "active" pages should remain in memory for utilization by the processor as it executes its tasks on the computer system. When the number of page frames available for allocation to new tasks falls below a threshold value those pages which, according to given criteria, are not frequently referenced, or which have not been referenced for some predetermined amount of time, are transferred to storage, thus freeing up that page frame for allocation to a page of data needed for a task demanding execution by the processor.

Page management routines use a core table to keep track of real memory page frames. Each page frame has an entry in the core table that contains pointers indicating the status and ownership of the corresponding real page. A core table entry may appear on either of two lists indicating its availability for paging: the free list; and the flush list. The free list contains those page frames immediately available for allocation while the flush list contains those page frames available for allocation after paging out the data currently in the page frames.

Control program memory management seeks to allocate system page frames of real memory to satisfy the demands for virtual pages made by the computing entities or tasks. The control program seeks to insure that the set of virtual storage pages that are resident in real page frames represent those pages that are most likely to be used. If this is not the case, the processor must spend considerable overhead time in paging out the unused pages and paging in the required pages. Thus, the first problem of memory management is to determine which pages are most likely to be used or conversely which pages are "least recently used".

A second problem is to efficiently manage the page in and page out activity. Paging out involves the transfer of pages from the high speed memory to a lower speed device such as a paging device or DASD. The slower speed of the paging device or DASD introduces inefficiencies if the pages are paged out one at a time. System overhead can be reduced if a group of pages can be paged out in one operation. Swapping relates to the paging in or paging out of groups of pages. Logical swapping is a process of creating lists of pages that are available to be written to the paging media. Physical swapping provides for better paging media use by writing and reading pages in groups.

The computer keeps a record of where in storage the paged out page actually resides, so that if that page is required for a task subsequently demanding execution it can be retrieved from storage and placed back in a memory page frame for use in the execution of that task.

The prior art has approached the implementation of paging in two ways. One is the Local Least Recently Used ("LLRU") approach with swapping. This involves periodically determining which pages of an individual user or computing entity have been referenced in a given immediately preceding period of computer resource allocation to a given user, or time slice, and grouping these "old" pages into "swap sets" for subsequent transfer to storage. Pages which have not been referenced in the given immediately preceding period or time slice are paged individually. Swap sets are transferred back to memory when any one page of the set is demanded. The idea is that since they were all referenced previously in a given time slice, there is a good likelihood they will be needed together again. Transferring pages in groups, or sets, is more efficient than transferring individual pages.

The other approach is the Global Least Recently Used ("GLRU") approach. This involves determining, on a system-wide basis, which pages in memory have not been recently referenced without regard to user or time slice considerations. The pages not recently referenced are then paged out as free page frames are required for allocation.

The GLRU approach has the advantage of simplicity. That is, it does not concern itself with considerations such as the owning user or its state. Similarly, it optimizes use of the memory for the system as a whole, by basing its paging decisions on system wide page usage rather than user dependent considerations. Also, since it is demand driven, that is, the time it spends looking for unreferenced pages to make room for new pages is dependent upon the actual demand for page frames, it adds overhead in proportion to the needs of the system. The rate at which pages in memory are checked to determine whether they have been re-referenced (and thus should be retained) automatically increases as a function of demand. In contrast, LLRU determines page references periodically, e.g. at the end of each timeslice, regardless of demand. LLRU has the further disadvantage of causing paging out of data at the end of a period when a lightly loaded system may have no need for the page frames. This can cause unnecessary paging overhead.

However, GLRU inherently selects its pages one at a time, so the benefits of swapping are not obtained. That is, pages are not grouped together for removal from and subsequent return to memory in some kind of efficiency-oriented scheme, such as relation by user, and likelihood of use together. Single page input and output is much less efficient than the swapping of groups. But since GLRU selects pages from the system wide list (the core table), they are selected in essentially random order. Swapping sets of unrelated pages would not achieve the desired benefits since the unrelated groups are not likely to be referenced again as a set.

The local LRU approach easily provides the benefits of swapping, because the system selects pages for swapping by looking at one user at a time a "local" view, resulting in user dependent organization of the pages in swap sets. The major disadvantage of local LRU is that it is not "demand driven". That is, it provides relatively fixed overhead in its formation of swap sets, whether or not the page frames freed by swapping are actually required. Further, the interval over which the reference decision is made is not tied to system demand nor recognition of program behavior that would influence the required time interval. The local focus of local LRU means that the paging activity of the entire system is not optimized. Thus, one user or computing entity can retain pages on a local basis which, in a global sense should have been paged out.

Thus there is a need for an improved method of paging to provide a more efficient memory management and paging system that minimizes the overhead requirements imposed by such a system through efficient use of processor and input and output resources.

SUMMARY OF THE INVENTION

The present invention provides, in a control system for a computer having memory, storage and a processor, and that controls the execution of tasks on behalf of a plurality of system computing entities, a method for efficiently transferring pages of data between storage and memory to maintain in memory only those pages of data necessary for current system processing requirements. According to the method pages that have not been referenced within a preceding time period are identified in memory on a system-wide basis. Reference pages are grouped into swap sets by referencing entity. These swap sets are then transferred to storage for later retrieval as a set when any one of the pages in the set is required by the system for use in memory.

The present invention combines the advantage of the global memory management approach with the input/output benefits of swapping. System wide optimization of memory is provided by not limiting page put selection to one user at a time. Since page selection is global, the approach is demand driven. Pages selected globally are then grouped by entity or user providing the benefits of swapping.

DETAILED DESCRIPTION OF THE DRAWINGS

The foregoing and other objects, features and advantages of the invention will be apparent from the more particular description of the preferred embodiment of the invention as illustrated in the accompanying drawings.

DETAILED DESCRIPTION OF THE PREFERRED EMBODIMENT

The preferred embodiment is most easily understood against the background of a more detailed description of the prior art paging mechanisms referred to above. Accordingly, there now follows such a background description of those prior art paging mechanisms.

The local least recently used memory management method evaluates page usage by each user or task at the end of each timeslice of processor usage by that user. At the beginning of the timeslice all user pages are marked as unreferenced. Whenever a page is referenced by that user, an indicator is set indicating that the page has been referenced. Any new pages read into memory during the timeslice are initially marked as unreferenced and receive a referenced indicator as they are used. Since sets of pages are read into memory as a group, some pages read in during the timeslice are not referenced during the remainder of that timeslice. At the end of the timeslice, the memory management method forms all pages referenced during the timeslice into swap sets of prespecified size for swapping to the swap devices. Any unreferenced pages are placed in a trim list, which provides available page frames for allocation by the memory management unit.

Those pages which are flagged as having been referenced at the end of the timeslice are placed on the "working set" list which is then placed immediately on one of two Swap Queues (Interactive or Non-Interactive). Pages on the Swap Queues tend to remain in memory longer than those pages on the Flush List. The mechanism by which this occurs is described below in connection with FIG. 1. The difference in resident time reflects the fact that statistically, pages used recently are most likely to continue to be used.

Note that a page may be brought into memory during a timeslice, yet not be referenced during that timeslice; the page may have been brought in as part of a swap set as the result of another page in that swap set being referenced. Thus, one or more of the pages in the swap set "brought along for the ride" may not be referenced during the timeslice.

Figure 1:
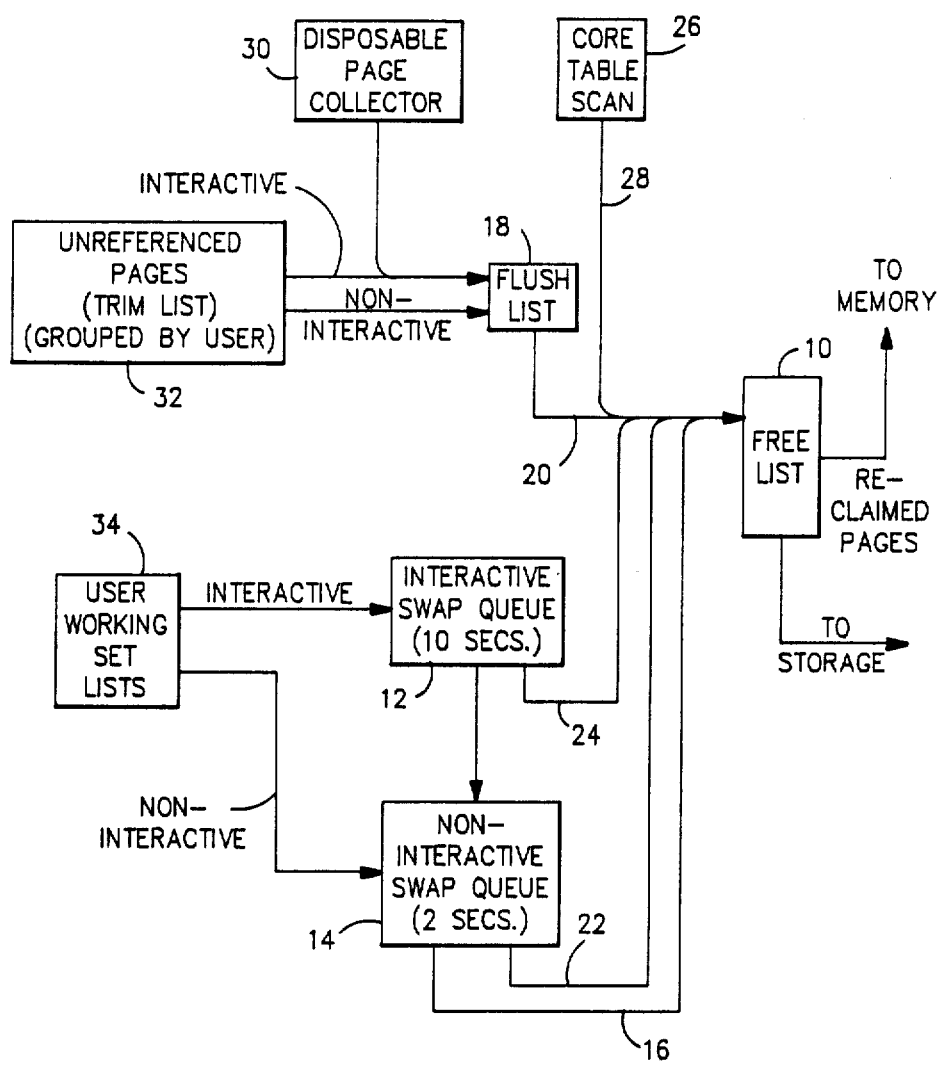
FIG. 1 is a block diagram illustrating the disposition of pages selected for paging from memory, in accordance with the prior art Local Least Recently Used mechanism.

FIG. 1 is a block diagram showing the paths of pages selected in accordance with the decision process described above. In all cases, pages frames are allocated to requesting tasks from the free list 10. The replenishment of the free list is done from several sources, in a specific order. The first choice for replenishment of the free list are page frames from the Swap Queues 12, 14 that have been there for an elapsed time longer than a given installation-settable time limit. In this example, a time limit of 10 seconds has been set for the Interactive Swap Queue 12, and two seconds has been selected for the Non-Interactive Swap Queue 14. Pages on the Interactive Swap Queue 12 for longer than 10 seconds are automatically transferred to the Non-Interactive Swap Queue 14. Thus, the first choice usually come from the Non-Interactive Swap Queue. This first choice source is depicted by line 16. The Swap Queues 12, 14 are supplied from Working Set lists 34 associated with individual users.

The computing entities or users are classified as "interactive" or "non-interactive" by the system scheduler, using known techniques. Interactive users are typically machines run by human operators who are actually sitting at a terminal and expecting a system response fairly promptly. A non-interactive user is a machine running a task known to take relatively long, and so prompt system responsiveness is not as important a system characteristic as for an interactive user.

Figure 2:
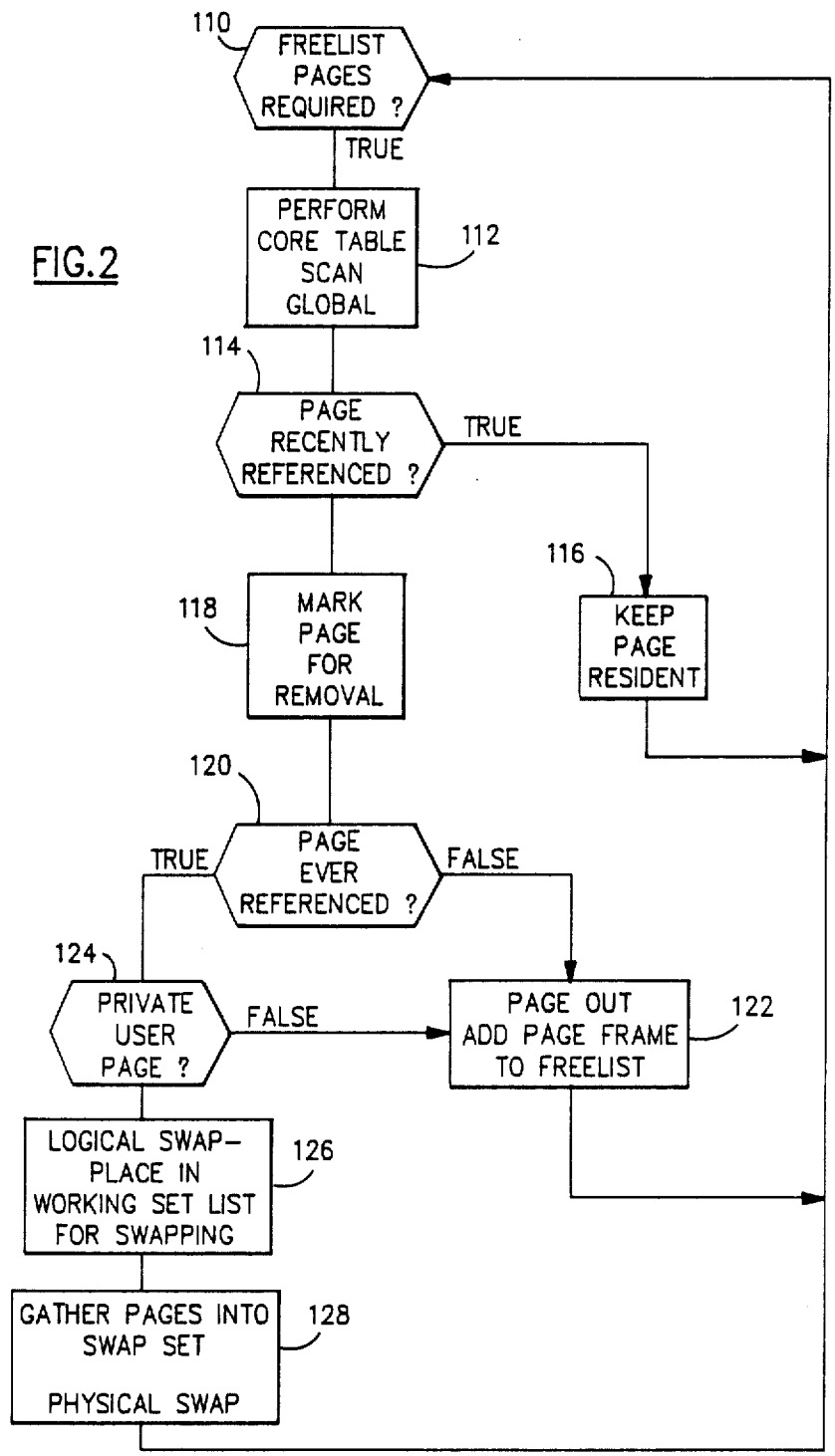
FIG. 2 is a flow chart illustrating the preferred embodiment of the present invention.

It will be appreciated that by establishing separate queues for the interactive and non-interactive users, as is the case with Queues 12 and 14 in FIG. 2, and setting up resident time limits as described, the referenced pages selected for swap set formation of the interactive user will remain resident in memory longer than those of the non-interactive users. This tends to improve the service time of the interactive user by minimizing the likelihood that pages they are using will be swapped out to DASD when they are operating at the keyboard at a "normal" rate.

The second choice of page frames for replenishing Free List 10 are those from the Flush List 18. This source of pages is made up principally of the unreferenced pages which were trimmed as described. These pages, too, are also categorized as to whether they were trimmed from an interactive versus a non-interactive user, by placing the interactive users' pages at the back end of Flush List 18 and those of the non-interactive users at the front end of Flush List 18. Page frames are selected for allocation from the front of the list which allows for a slight extra life time in memory for the unreferenced pages of the interactive users.

The third and fourth choice of page frames for Free List 10 replenishment are invoked only after Flush List 18 is empty. The third choice pages are the non-interactive swappable pages 14, which have not exceeded the residency time, selected in order of age, oldest first and newest last.

When the Non-Interactive Swap Queue 14 is empty, the fourth choice is invoked, the interactive swappable pages in Queue 12 which have not exceeded the residency time. These are also selected in order of age, oldest first and newest last. Again, the preference for holding the pages of interactive users in memory longer is implemented in the mechanism.

The fifth choice of page frames to replenish Free List 10 is pages from a Core Table Scan 26. Occasionally, none of the prior described mechanisms produce enough pages to replenish Free List 10. In that case, any page that is "available" is selected to be placed on Free List 10. The primary thing that makes a page "unavailable" is that it is locked for an I/O operation. For example, such a page may have asynchronously moving data in or out of that page, and it cannot be taken out of memory until the I/O operation completes.

Finally, it is important to note that another source of pages for Flush List 18 is the Disposable Page Collector 30. Some pages are not associated with a specific computing entity or use and are not analyzed by the local LRU memory management method. Disposable Page Collector 30 is a mechanism that periodically collects any such unreferenced pages. They are then placed on Flush List 18.

Further details and background may be found in IBM Virtual Machine/System Product High Performance Option, Release 4.2 manuals. E.g., IBM Virtual Machine/System Product High Performance Option, System Programmer's Guide, Release 4.2, Document Number SC19-6224-6, pp. 22-32.

The above text describes the prior art local Least Recently Used mechanism, which uses swapping. The other common prior art paging mechanism is the Global Least Recently Used method, which does not use swapping. GLRU implementation is quite simple compared with LLRU. core table scan mechanism scans the core table, which, as described above, contains a list of all real page frames, their contents and status. The core table scan notes which pages were referenced since the last scan and which have not been referenced. The scanner scans through all of the pages in memory sequentially and cyclically; every time a page it examines is marked as referenced, it stays resident; if the page is unreferenced it may be placed on the free list immediately, if the information in that page already exists on an external storage device or, if not, e.g. because the page was modified while resident in memory, after it has been copied to external storage. When the mechanism detects that a page is referenced and is therefore going to stay resident, the mechanism resets the reference bit. Later, when the scan wraps around and gets back to that page, the determination is made again whether the page has been referenced since the last time it was scanned. If the page has been rereferenced, it is still active and is allowed to remain. However, if it remained unreferenced since the last scan, then it is eligible to be selected for free list replenishment.

One of the advantages of the GLRU mechanism is its simplicity. It does not distinguish between classes of user, or between user and system pages, and it does not require the installer to select time limits for queue residency durations, for example, or to maintain the multiple queues of LLRU. The frequency of scanning for replacement of the free list is strictly a function of the load on the system. If no pages are needed for the free list because the load is light, the core table scan simply stops and there is no overhead for it. As the load increases, the increased demand for pages directly affects the rate of the core table scan, which increases the paging rate.

Thus, on the one hand, global LRU provides, an efficient, demand-driven scheme with little overhead involved in selecting page frames for placement on the free list. On the other hand, LLRU swapping provides a double benefit. One benefit is that the use of moveable head DASD storage devices is more efficient when, say, ten pages are moved in one operation instead of one. The major delays for seek time and access time in the device, and rotational delay until the heads are positioned, are averaged across those ten pages. The second benefit is in CPU time. If the mechanism for the formation of swap sets is a good one, the bringing in of a swap set with, say ten pages, will cause a number of pages which actually need to be used together to be brought in in a single operation, saving the system the trouble of managing page faults in bringing in those other pages.

FIG. 2 is a flow chart of the preferred embodiment of the present invention. It will be noted that the preferred embodiment has much of the prior art simplicity of the GLRU memory management mechanism. However, it adds a swapping mechanism to achieve the advantages of swapping sets of pages rather than paging single pages.

Figure 3:
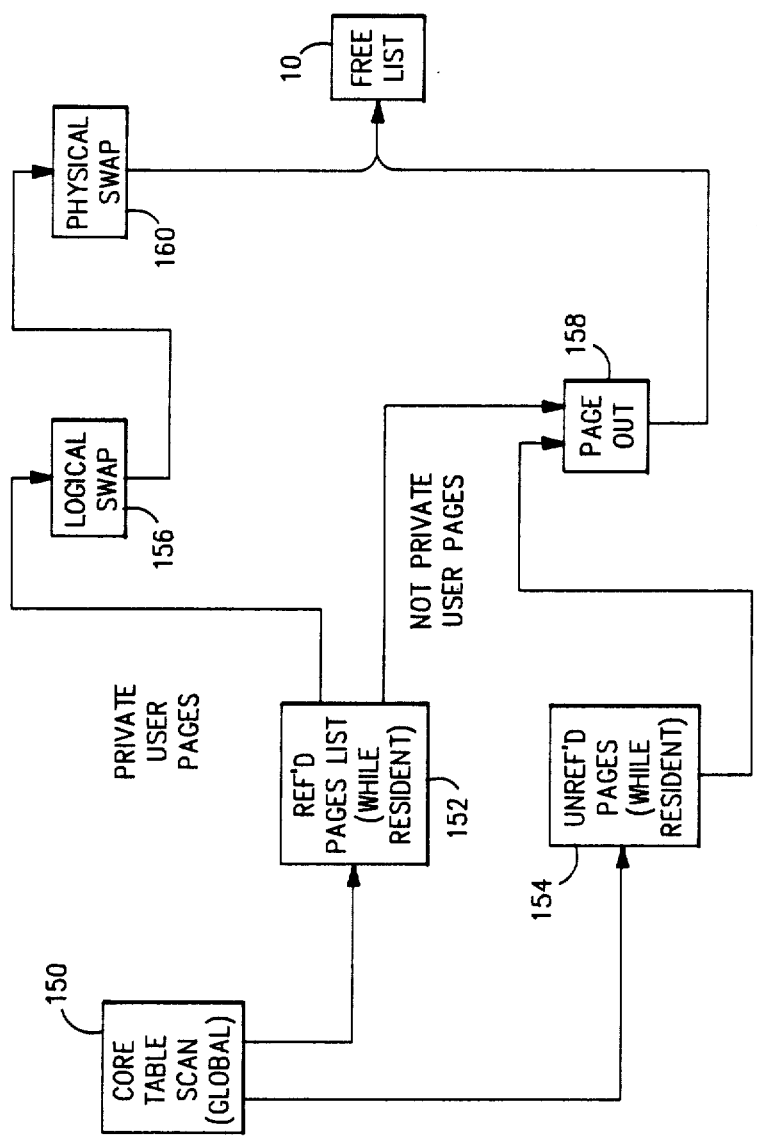
FIG. 3 is a block diagram of a memory management system according to the preferred embodiment of the present invention.

FIG. 3 is a block diagram of the preferred embodiment of the present invention. A comparison between FIG. 3 and FIG. 1, reveals that the present invention provides a much simpler implementation of memory management and paging. The preferred embodiment will be described with reference to FIGS. 2 and 3.

The present invention employs a global least recently used memory management scheme to select those page frames to be freed for allocation by paging. The present invention is demand driven, like global LRU systems, and performs the core table scan and related paging or swapping activities only when page frames are required for the free list. Thus, in FIG. 2, the first decision block 110 is whether free list pages are required. If so, a global core table scan is performed 112. A determination 114 is made on the basis of whether the page was referenced since the last time the core table scan mechanism caused the page to be examined. If the page is marked as referenced, the system keeps the page and moves on 116. However, if the page is not so marked, the system marks the page for page out of memory 118. However, before paging out the page, the system makes the further inquiry 120 of whether the page was ever referenced while resident. Recall that some pages come into memory by way of the swapping mechanism not because they were specifically needed, but because they were part of the set in which a needed page exists. These "hitchhiker" pages may or may not be referenced after having been brought into memory. If such a page is found that has never been referenced, it is not eligible for swapping, and so is made available individually for paging by way of known paging mechanisms 122. A command can be used to override this decision and cause these "hitchhiker" pages to be included in the current swap sets. The system next determines whether the referenced page is a private user page 124. Pages that do not belong to private users cannot be grouped into swap sets and therefore are paged out singly 122. Pages belonging to private users are grouped into working sets, one per user, through logical swapping process 126. When a sufficient number of pages are gathered into a particular user's working set, these pages are physically swapped through the swapping device 128.

FIG. 3 depicts the lists of pages or queues that exist during various steps of the process. The performance of core table scan 112 scans core table 150. The core table scan results in a list of pages referenced since they were allocated (i.e. while resident) 152 and those pages unreferenced 154. The referenced pages 152 are tested 124 to determine whether or not they belong to private users. Note that any pages that have been recently referenced (referenced since the last core table scan) are not selected by the core table scan and do not appear on any of the queues. The pages that are not private user pages and those that were unreferenced while resident 154 are placed in the page out queue 158 from which they are singly paged out and the page frames made available to free list 10. The private user pages from queue 152 are placed into logic swap queue 156. When a sufficient number of pages are accumulated for a particular user, they are placed on the physical swap queue 160 resulting ultimately in the page frames being made available to free list 10.

Contrast this with the prior art LLRU, in which pages are placed on the user's working set list at the end of one time slice. The pages are subsequently, as required, gathered into sets according to virtual address, which may or may not be advantageous. According to the preferred embodiment, the analysis of page references considers the entire time the page was resident, not just the most recent timeslice. The gathering of pages into swap sets by way of the logical swap working set list, is largely temporal, which is believed to gather pages more likely to be referenced together again.

Pages are placed on the owning user's working set list via known techniques. Note that significant advantages accrue from this implementation. Prior art mechanisms exist for creating and maintaining working set lists and for physically swapping these sets. For example, IBM VM/SP HPO includes such mechanisms.

Note also that in the preferred embodiment of the present invention swapping decisions and memory management decisions are separate, while in the prior art LLRU with swapping mechanism, the decision was essentially the same. This results in significant improvements in the overhead consequences of paging, especially paging involving swapping. The use of a separate global LRU memory management technique causes the present invention to be demand driven. In a system with little memory contention, the core table scan and page selection will proceed relatively slowly. Thus, the collection of swap sets and the associated paging activity will proceed at a correspondingly slow rate. As system demand increases, the selection of pages for swapping will occur at an increasing rate as will the bundling and swapping activities. The preferred embodiment operates with fewer page queues and correspondingly, requires less processor intervention in the memory management and paging process than prior art systems such as LLRU. In the preferred embodiment, once pages are selected for swapping they are bundled up and swapped out to DASD almost immediately. As described above, with the LLRU with swapping, considerable overhead could be consumed in identifying pages for swapping, and placing them on a working set list, while those pages may ultimately never be swapped following the timeslice in which they were so processed, because pages in the set may be needed by the system relatively soon. This is virtually eliminated by the preferred embodiment of the present invention because the elapsed time for pages to be resident in a working set list is greatly reduced.

In addition, implementation of the preferred embodiment of the present invention, once the principles of the present invention are understood, is fairly straightforward. This is because the component mechanisms of the embodiment are found in the prior art, such as the core table scan mechanism, the flush list, and the logical queues.

The following code could be used to implement for the preferred embodiment as shown in FIG. 2:

```
For each page in real memory do;
   if page not available for selection, skip it;
   if page has been recently-referenced, then do;
      set page ever-referenced;
      set page recently-unreferenced;
      skip this page (leave it resident);
      end;
   else (page not recently referenced) do; (note - page is
      "selected" and is to be moved out of real memory)
   if not ever-referenced then do;
      (we will not use this page on a swap set)
      if page changed, then (first write single page out,
         then freelist)
         otherwise, put directly on freelist.
      if freelist replenished, exit.
      end;
   if ever-referenced then do;
      if not a private user page, single page as above
``` logically swap this page, which collects it on a list of other pages logically swapped for the same user.

if we now have a full swap set, or this is the last swappable page the user has, then do; physically swap one swap set to DASD; if freelist replenished, exit;

end;

end;

Thus, while the invention has been described with reference to preferred embodiments thereof, it will be understood by those skilled in the art that various changes in form and details may be made without departing from the scope of the invention. For example, while the core table scan is a convenient mechanism to use for identifying pages not recently referenced, other mechanisms can easily be substituted. Other modifications and implementations are readily conceived.

We claim:

1. A method for managing memory of a computer system having memory, storage, and one or more processors and configured to process a plurality of tasks originated by a plurality of computing entities, wherein said memory is divided into a plurality of page frames, each page frame containing a page of data, and wherein one or more of said page frames is assigned to each of said plurality of tasks of said computing entities and any access by said computing entities to said assigned page frames is recorded with each of said page frames, wherein said method is performed by a task processed by said computer system, the method comprising the steps of:

examining each of said page frames periodically to determine whether said page frame has been recently accessed by said computing entity task assigned said page frame;

performing the following steps for each page frame not recently accessed:

determining whether said page frame has been accessed since being assigned to said task;

transferring the page of data contained in said page frame to said storage and making said page frame available for reassignment, if said page frame has not been accessed since being assigned;

collecting the page of data contained in said page frame into a set with data from previously collected page frames assigned to a given computing entity, if said page frame has been accessed since being assigned; and transferring to said storage, when a number of page frames collected into said set reaches a threshold of at least two page frames, said pages of data collected in said set and making said page frames comprising said set available for reassignment.

2. The method of claim 1, wherein the period of said examining step depends upon a number of page frames demanded for reassignment to tasks.

3. The method of claim 2, wherein each of said page frames comprises a plurality of blocks of data of predetermined size.

4. The method of claim 2, wherein the threshold in said second transferring step is selectable for said computer system.

5. The method of claim 1, wherein said computing entities are designated as private entities or system entities, and wherein said collecting step comprises:

collecting the pages of data contained in page frames assigned to a private entity into a set, if said page frame has been accessed since being assigned, and transferring said page of data to storage and making said page frame available for reassignment, if said page frame is assigned to a system entity.

6. The method of claim 1, further comprising the step of:

transferring said set of data contained in said page frames from storage to memory and assigning said page frames to said computing entity previously assigned said page frames, when said computing entity references data previously contained in one of said page frames.

7. A method of memory management in a computer system having one or more processors, storage, and memory divided into a fixed number of page frames each containing task data, said computer system configured to process a plurality of tasks, each task controlled by one of a plurality of computing entities, wherein each of said tasks requires one or more page frames to contain task data for its processing, wherein the computer system allocates said fixed number of page frames to said tasks so that the task data most likely to be used by the processor is retained in said page frames, and wherein the method is performed by a task processed by said computer system, the method comprising the steps of:

creating a list of said fixed number of page frames wherein said list contains an entry for each of said page frames with information specifying a task and computing entity currently assigned said page frame and whether said page frame has been referenced by said task, or specifying that said page frame is available for reassignment;

examining each entry of said list periodically to determine whether said page frame identified by said entry has been referenced since said entry was last examined;

proceeding to examine a next entry if said page frame was referenced;

determining whether said page frame identified by said entry has been referenced since said page frame was assigned to said task, if said page frame has not been referenced since last being examined;

transferring said task data from the page frame identified by said entry to said storage if said page frame was not referenced since assigned, and modifying said entry to specify that said page frame is available for reassignment;

adding said page frame to a list of working set page frames assigned to said computing entity, if said page frame was referenced since assigned;

transferring as a set said task data from said plurality of page frames in said working set list to storage when a number of page frames in said working set list reaches a threshold, said threshold being two or more page frames, and modifying said entry in said list of page frames to specify that said page frame is available for reassignment.

8. The method of claim 7, wherein the period of said examining step depends upon a number of page frames demanded for reassignment to tasks.

9. The method of claim 8, wherein each of said page frames comprises a plurality of blocks of data of predetermined size.

10. The method of claim 8, wherein the number of page frames transferred in said step of transferring as a set said task data, is selectable for said computer system.

11. The method of claim 10, further comprising the step of:
transferring from storage to memory as a set said task data in said working set of one of said computing entities when any of said task data in said set is referenced by said computing entity.

12. A system for managing real memory in a computer system having memory, processors, and storage, wherein said computer system processes a plurality of tasks for private and system computing entities, said system comprising:
first memory means for maintaining a real memory address, an allocation status, and a count of references for each of a plurality of real memory page frames;
means for reading said first memory means periodically;
first means for determining whether each of said page frames has been referenced by one of said tasks during said period, said first means for determining connected to said means for reading;
second means for determining whether each of said page frame has been referenced by a task since allocated to said task, said second means for determining connected to said means for reading;
second memory means for maintaining addresses of all page frames referenced since allocated, said second memory means responsive to said second means for determining;
third memory means for maintaining addresses of all page frames not referenced since allocated, said third memory means responsive to said second means for determining;
fourth memory means for providing address of any page frame available for allocation, said fourth memory means connected to said means for reading and responsive to said allocation status;
means for transferring to storage data contained in a page frame addressed by said third memory means or by said second memory means, if said page frame is not allocated to a private entity, and modifying said fourth means to contain the address of said page frame;
fifth memory means for maintaining the addresses of all page frames assigned to a private entity and referenced since allocated; and
means for transferring to storage a set of data from a plurality of page frames addressed by said fifth memory means and modifying said fourth memory means to contain the addresses of said page frames.

* * * * *